(12) United States Patent
Ammar

(10) Patent No.: US 7,135,848 B1
(45) Date of Patent: Nov. 14, 2006

(54) HIGHLY INTEGRATED RADIOMETER SENSOR CELL

(75) Inventor: Danny F. Ammar, Windermere, FL (US)

(73) Assignee: Xytrans, Inc., Orlando, FL (US)

( * ) Notice: Subject to any disclaimer, the term of this patent is extended or adjusted under 35 U.S.C. 154(b) by 0 days.

(21) Appl. No.: 11/301,297

(22) Filed: Dec. 12, 2005

(51) Int. Cl.
*G01S 3/02* (2006.01)

(52) U.S. Cl. .................... 324/76.14; 324/174; 374/1
(58) Field of Classification Search ............ 324/76.14
See application file for complete search history.

(56) References Cited

U.S. PATENT DOCUMENTS

| 6,052,024 A | * | 4/2000 | Lo et al. ................ 330/53 |
| 6,054,900 A |  | 4/2000 | Ishida et al. ............ 330/286 |
| 6,424,223 B1 |  | 7/2002 | Wang et al. ............ 330/286 |
| 2005/0063447 A1 |  | 3/2005 | Ammar ..................... 374/1 |
| 2005/0122254 A1 |  | 6/2005 | Ammar ................... 342/174 |

\* cited by examiner

*Primary Examiner*—Vincent Q. Nguyen
(74) *Attorney, Agent, or Firm*—Allen, Dyer, Doppelt, Milbrath & Gilchrist, P.A.

(57) ABSTRACT

A highly integrated radiometer sensor cell includes a base having opposing surfaces with one surface adapted for surface mounting on a board. A radio frequency (RF) feed receives RF signals and at least one MMIC is operatively connected to the RF feed and receives the RF signals from the RF feed. This MMIC can include at least one quadrature hybrid, a low noise amplifier (LNA) connected thereto, and a detector circuit for producing a detected signal for further radiometer processing.

25 Claims, 10 Drawing Sheets

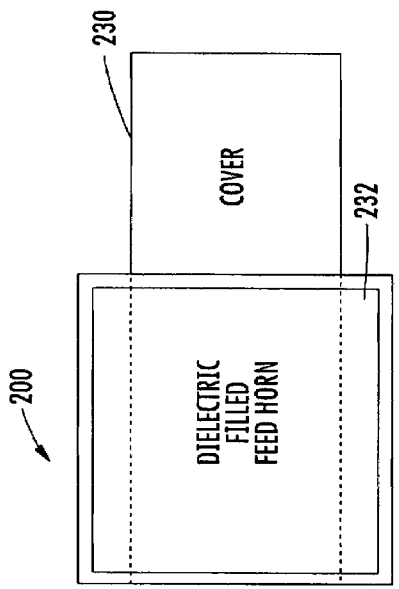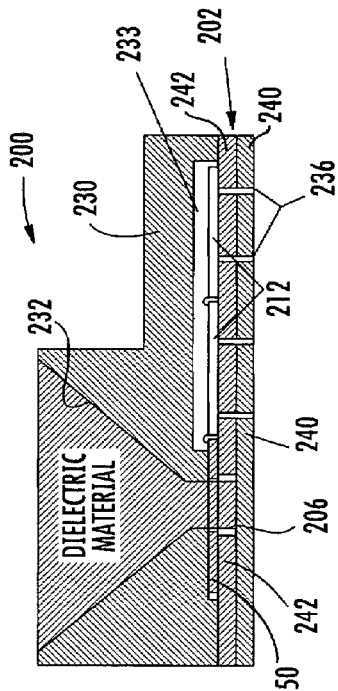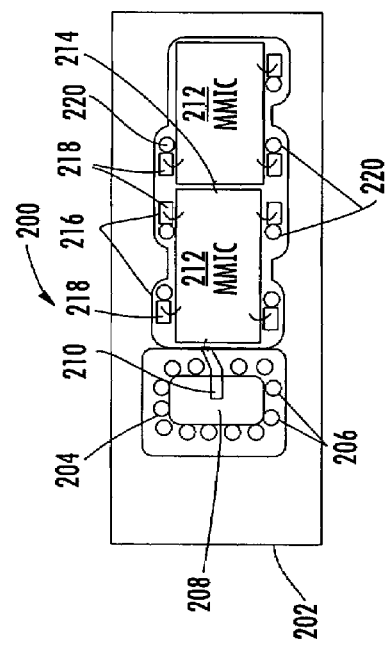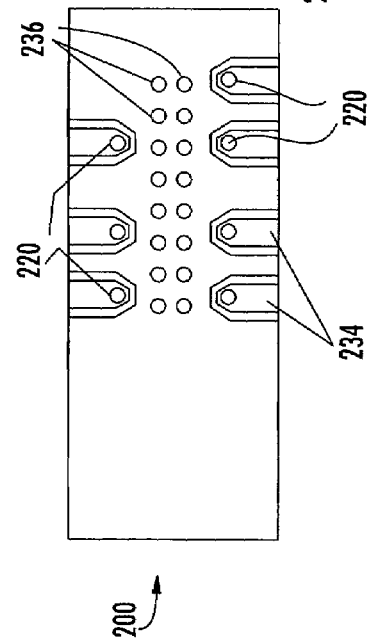

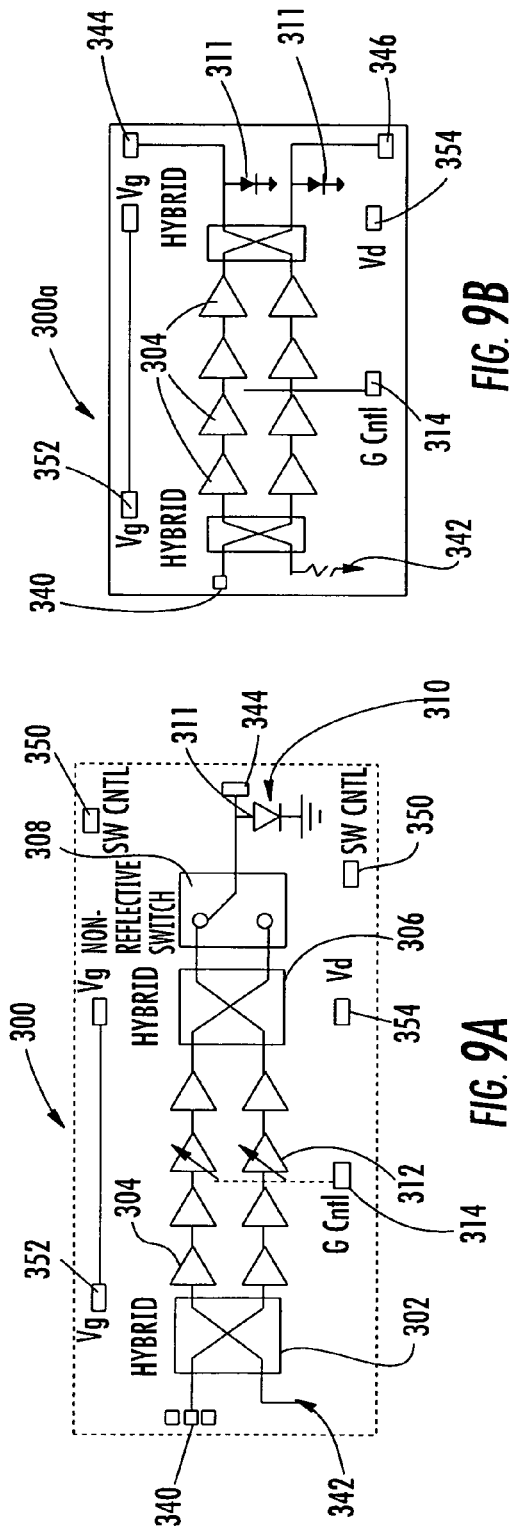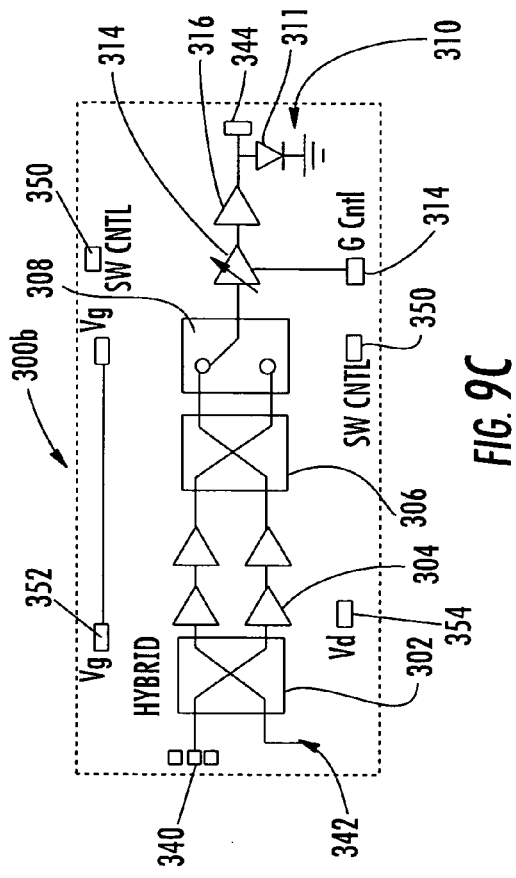
FIG. 9A
FIG. 9B
FIG. 9C

HIGHLY INTEGRATED RADIOMETER SENSOR CELL

FIELD OF THE INVENTION

This application relates to the field of radiometers, and more particularly, this invention relates to the packaging of highly integrated radiometer sensors having improved sensitivity.

BACKGROUND OF THE INVENTION

Since radio waves may be considered long wave infrared radiation, a hot body would be expected to radiate microwave energy thermally. To be a good radiator of microwave energy, a body typically must be a good absorber. A good thermal radiator is a "black body." The amount of radiation emitted in the Millimeter Wave (MMW) range is about $10^8$ times smaller than the amount emitted in the infrared range. Current MMW receivers, however, have at least $10^5$ times better noise performance than infrared detectors, and with some temperature contrast, the remaining $10^3$ may be recovered. This makes passive MMW imaging comparable in performance with current infrared systems. This unique characteristic makes MMW radiometers a popular choice for sensing thermal radiation. MMW radiometers have also been used in other applications, for example, remote terrestrial and extra-terrestrial sensing, medical diagnostics and defense applications. MMW electromagnetic radiation windows occur at 35 GHz, 94 GHz, 140 GHz and 220 GHz. The choice of frequency depends on specific applications.

Focal plane arrays are used to form images from the radiation received by a reflector antenna. Millimeter wave (MMW) focal plane array radiometers also have been used in many applications to form images based on thermal sensing of radiated microwave energy. The sensitivity of existing radiometer designs, however, has been limited to about 1 deg K, resulting in poor images.

The operating principles of the radiometers is fully described in the literature. The design of a typical radiometer is based on comparing the level of electromagnetic noise emitted by an unknown source to a reference or stable noise source. This technique and devices were initially proposed by Dicke [R. H. Dicke, "The Measurement of Thermal Radiation at Microwave Frequencies," The Review of Scientific Instruments, Vol. 17, No. 7, July 1946].

In a Dicke radiometer, the signals from an antenna are sampled and compared with signals from a reference source maintained at a known constant temperature. This overcomes some of the problems of amplifier instability, but in general does not alter effects resulting from imperfect components and thermal gradients.

While other types of radiometric devices have been used with some success, the Dicke (or comparison) type of radiometer has been the most widely used for the study of relatively low level noise-like MMW signals, especially where the noise signals to be examined are often small in comparison to the internally generated noise level within the radiometer receiver. While there are several types of comparison radiometers, one popular type of radiometer for use in the microwave/millimeter wave frequency bands compares an incoming signal to be measured with a standard or calibrated reference noise signal. This type of radiometer compares the amplitude of an unknown noise signal coming from the source to be examined with a known amplitude of a noise signal from a calibration source. This radiometer has been found useful in measuring with considerable accuracy the effective temperature of an unknown source.

In the Dicke or comparison type radiometer, the receiver input is switched between the antenna and a local reference signal noise generator. The detected and amplified receiver output is coupled to a phase-sensing detector operated in synchronism with the input switching. The output signal from such a radiometer receiver is proportionate to the difference between the temperature of the reference signal source and the temperature of the source viewed by the antenna inasmuch as the phase-sensing detector acts to subtract the background or internal noise of the receiver.

A Dicke radiometer uses an RF switch coupled between an antenna and a radiometer receiver, allowing the receiver to alternate between the antenna and a known reference load termination. The receiver output is connected to a synchronous detector that produces an output voltage proportional to a difference between the antenna and the reference temperature. Null balance operation for the Dicke radiometer has been achieved by coupling in noise from a hot noise diode to the antenna port of the RF switch, thereby enabling the matching of temperature from standard reference loads.

The sensitivity of radiometer measurements are also often limited by random gain fluctuations in the RF front end, low frequency noise (1/f), and bias in the detector circuits. Over the last decades many special techniques, including Dicke switching, have been implemented to reduce measurement errors. Many of these proposals have not yielded a solution that allows MMW radiometers to be commercially viable. In addition, the high cost of MMW RF receivers has limited the number of channels in the radiometer, resulting in a requirement to scan both azimuth and elevation to create an image.

Radiometers were traditionally used for space explorations and earth images. Recent advances in radiometer sensitivity are enabling the use of these devices in many applications, such as concealed weapon detection, passive imaging, medical diagnostics and many other applications. The cost of millimeter wave (MMW) radiometer sensors, however, is still relatively high due to manufacturing challenges. In most applications, the sensor is only made up of very few channels. Images are typically created by scanning an antenna sub reflector in one or two dimensions to create a multi-pixel image. Although this technique is widely used, the image frame rate is limited by the mechanical scan rate.

In addition to their high cost, current radiometers typically suffer from large size due to physical restrictions imposed by their feedhorns. The size of the feedhorn is dictated by the wavelength of the RF signal, which is an order of magnitude larger than that of infrared or optical signals.

SUMMARY OF THE INVENTION

A radiometer sensor cell enclosed within a miniature composite package or chip package, in accordance with one non-limiting example of the present invention, includes a base having opposing surfaces and one surface adapted for surface mounting on a board. A radio frequency (RF) feed is mounted on the base and receives RF signals and at least one MMIC operatively connected to the RF feed. The MMIC receives the RF signals from the RF feed. The MMIC comprises at least one quadrature hybrid used to equalize the gain in two parallel amplifier stages, a low noise amplifier (LNA) connected thereto, and a detector circuit for producing a detected signal for further radiometer processing. A cover is secured on the base and encloses the RF feed and MMIC.

In accordance with another aspect, the RF feed comprises a dielectric filled feed horn. The RF feed can be formed as a microstrip-to-waveguide transition operatively connected between the feedhorn and the MMIC and receiving RF signals from the feedhorn and passing the RF signals into the MMIC. This microstrip-to-waveguide transition can include backshort vias and a launch probe operatively connected to the MMIC for passing RF signals to the MMIC.

In yet another aspect, the MMIC can be formed as a switch connected to the quadrature hybrid. The MMIC can be formed as an input quadrature hybrid having at least one RF input and parallel signal path outputs operatively connected to a respective amplifier within each signal path and an output quadrature hybrid connected to each respective amplifier for outputting a signal to be detected by the detector circuit. The switch can be connected to the output quadrature hybrid. The detector circuit can be formed as a diode operatively connected to the switch for forming a detected output. The MMIC could include a variable gain amplifier. DC signal vias can extend from the at least one MMIC through the base.

In yet another aspect, a plurality of radiometer sensor cells can be surface mounted on a printed wiring board to form a radiometer device. By selectively rotating individual radiometer sensor cells, the selection of polarization can be accomplished.

BRIEF DESCRIPTION OF THE DRAWINGS

Other objects, features and advantages of the present invention will become apparent from the detailed description of the invention which follows, when considered in light of the accompanying drawings in which:

FIG. 7A is an inside view of the radiometer sensor cell as shown in FIG. 6.

FIG. 7B is a top plan view of the radiometer sensor cell as shown in FIG. 6.

FIG. 7C is a bottom plan view of the radiometer sensor cell as shown in FIG. 6.

FIG. 7D is a cross-sectional view of the radiation sensor cell shown in FIG. 6.

FIGS. 9A–9C are top plan views of respective single-chip MMIC circuits for RF amplification and detection that can be used in the radiometer sensor cell, in accordance with one non-limiting example of the present invention.

DETAILED DESCRIPTION OF THE PREFERRED EMBODIMENTS

Figure 1:
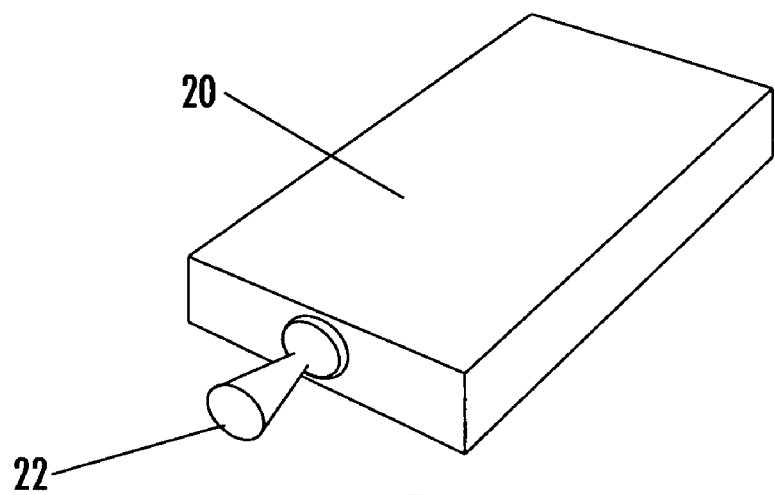
FIG. 1 is a perspective view of a typical single channel radiometer and feedhorn.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Current radiometer sensors are high in cost and have an overly large size imposed by physical limitations, which have prevented adequate commercialization of such sensors. In accordance with a non-limiting example of the present invention, low cost radiometer sensor cells as integrated packages can now be produced in high volume and overcome the physical restrictions by relying on a miniature radiometer package as an integral radiometer sensor "cell" that permits RF energy sensing and detection. The radiometer sensor cell as a package is designed similar in concept to light sensing diodes, and in the embodiments and examples described herein, RF energy is sensed instead of light. A diode equivalent circuit for radiometer radio frequency (RF) sensing is formed as a radiometer sensor cell or package, and can be termed a radiometer pixel cell, and can also be referred to as a radiometer pixel or "Radipixel" because of its characteristics of sensing this RF energy. The radiometer sensor cells, in accordance with one non-limiting example of the present invention, are self-contained and encompass the RF feed, signal amplification, switching (if required) and any required RF signal detection. Because the RF functions and detection are self-contained, the radiometer sensor cells are packaged as small surface mounted chips or packages that mount directly to a substrate, for example, an FR4 board or similar radiometer sensor support or printed wiring board, eliminating the requirement for an expensive housing.

The radiometer sensor cells in accordance with one non-limiting example of the present invention are relatively easy to manufacture with existing manufacturing techniques and provide a high degree of flexibility in creating one or two-dimensional arrays of radiometer sensors. A self-contained, individual radiometer sensor cell converts the RF energy into a detected video signal, analogous to using optical diodes to sense light intensity and converting it to a current or voltage signal. All connections to this radiometer sensor cell can be typically at DC levels and therefore, normal surface mount technology (SMT) can be used for the overall radiometer device assembly.

In accordance with another non-limiting example of the present invention, size issues for radiometer sensor cells are also overcome by implementing the RF waveguide and feedhorn in dielectric material, and thus achieving a smaller size per radiometer sensor cell and allowing closer spacing of any radiometer sensor cell channels. Multisensor imaging radiometer sensor assemblies with high update rate can be achieved without antenna scanning.

In accordance with a non-limiting example of the present invention, a radiometer device as an imaging system can be made from a plurality of individual radiometer sensor cells, and include self-contained surface mount technology radiometer sensor cells that convert RF energy to a detected output voltage. Each radiometer sensor cell can include the dielectrically filled waveguides and feedhorn to reduce size and allow tighter sensor-to-sensor spacing. The radiometer sensor cell can encompass the radiometer radio frequency (RF) functions into a single chip, including any low noise amplifier (LNA) functions, the switch and power detection. The RF function, such as the LNA, the switch and the power detector, can be combined into a multi-function Monolithic Microwave Integrated Circuit (MMIC) chip that facilitates the radiometer sensor assembly. The radiometer sensor cell, in accordance with another non-limiting example of the present invention, substantially eliminates the requirement for a bandpass filter and the MMIC low noise amplifiers (LNA's) can be designed with an appropriate bandwidth to allow flexible designs of multi-channel radiometer sensor circuits. This type of design also can eliminate the requirement for an expensive housing and RF feedhorns. This design can also support both horizontal and vertical polarizations that can be set by the orientation of the radiometer sensor cells surface mounted on a support board such as a printed wiring board.

FIG. 1 is an isometric view of a typical single channel radiometer 20 having an air filled feedhorn antenna 22, which captures the RF energy emitted from a target. The feedhorn 22 is typically placed in an antenna focal point as is known to those skilled in the art. Radiometer images are created by scanning a sub reflector that points the antenna beam in different directions.

Figure 2A:
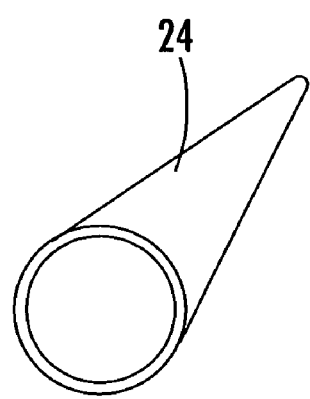
FIG. 2A is a perspective view of a typical circular feedhorn that can be used with a radiometer.
Figure 2B:
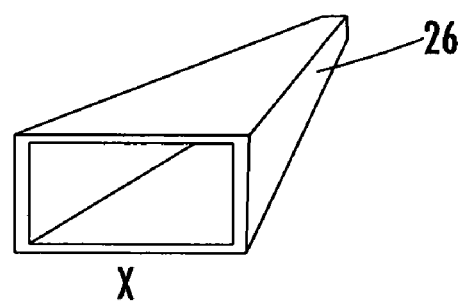
FIG. 2B is a perspective view of a typical rectangular feedhorn that can be used with a radiometer.

As known to those skilled in the art, there are different types of antenna feedhorns. The most popular are a circular feedhorn 24 (FIG. 2A) and a rectangular feedhorn 26 (FIG. 2A). The beam width generated by a rectangular feedhorn 26 such as shown in FIG. 2B typically is proportional to the size of the horn.

$$\theta = k\lambda/X,$$

where $\theta$ is a 3 dB beamwidth, k is a constant from 56 to 70 (dependent on shape and efficiency), $\lambda$ is the wavelength, and X is the horn dimension (width or height).

To achieve reasonably small beam width, these types of feedhorns are relatively large, making it difficult to create one or two-dimensional sensor arrays for radiometers. The spacing between the feedhorns required to create good images in radiometer applications is typically less than a single wavelength. Also, the beam width created by each feedhorn should be small enough to match the antenna lens size. For example, at 90 GHz, an optimum feedhorn spacing is less than or equal to about 0.133 inches. This spacing could result in a small horn size and consequently wide unusable beam width. In most applications, a trade-off is required between the beamwidth and any feedhorn spacing.

Figure 3:
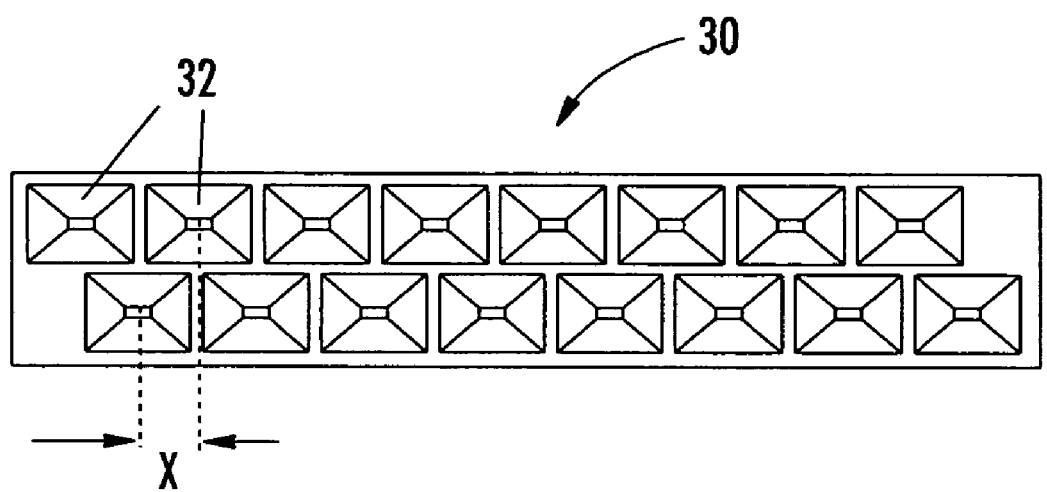
FIG. 3 is a top plan view of a staggered two-dimensional feedhorn array typically used in some types of radiometers.

Many techniques have been used to overcome the spacing/beamwidth restrictions. An example of one technique is shown in the example of the feedhorn array 30 in FIG. 3, where the individual feedhorns 32 are staggered and offset to create a closer spacing between the feedhorns. With this technique, however, to achieve reasonable beam widths of about 30 degrees, the spacing between the center line of the feedhorns indicated at "X" typically exceeds one wavelength at 90 GHz.

Figure 4:
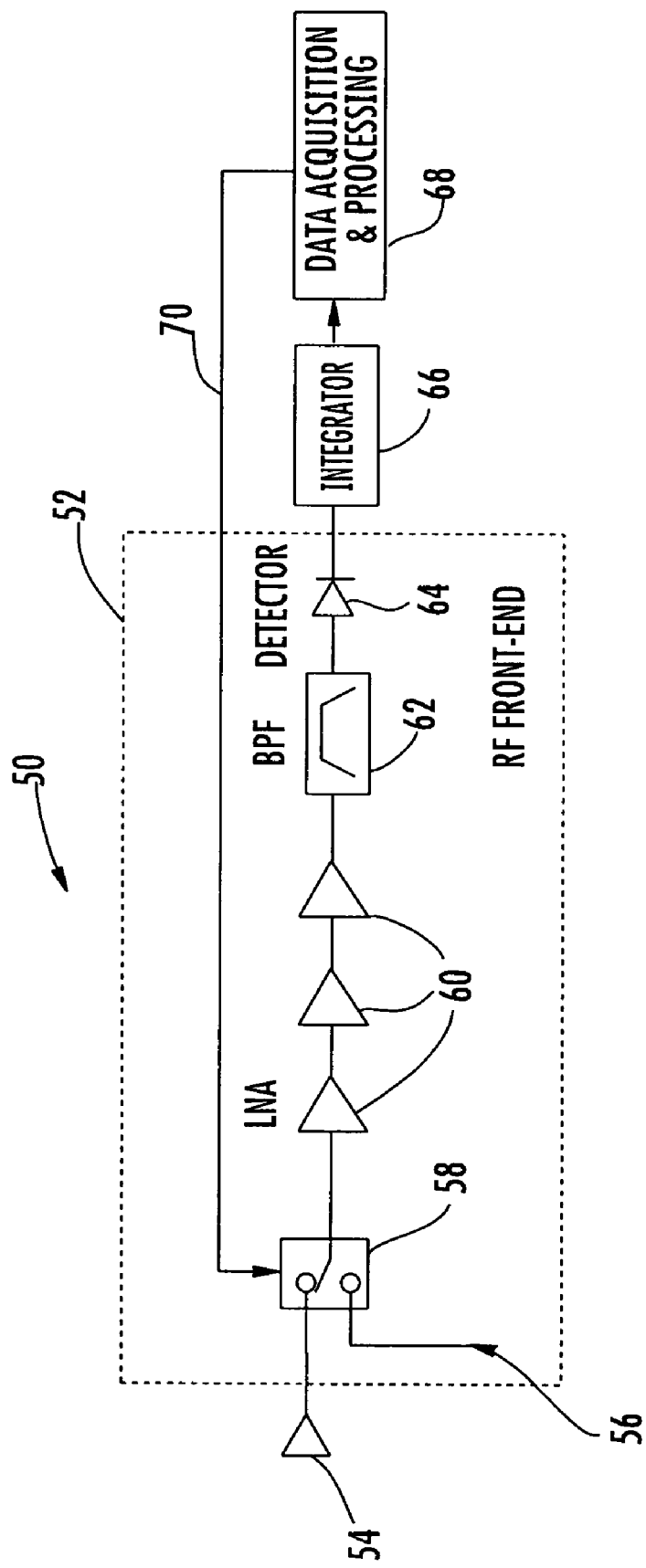
FIG. 4 is a block diagram showing basic components of a typical radiometer circuit.

FIG. 4 is a schematic block diagram showing high level components used in a typical single channel radiometer, illustrated generally at 50. As illustrated, the radiometer 50 includes a RF front-end as indicated by the dashed lines at 52 and includes a switch 58, such as a Dicke switch, which receives signals from an antenna 54 and reference load 56. The output from the switch 58 passes through a series of low noise amplifiers (LNA's) 60 and into a bandpass filter 62. The filtered signal is detected within a detector 64 and integrated within an integrator circuit 66. The integrated signal passes into a data acquisition and processing circuit 68 with feedback of a switch driver signal 70 into the switch 58.

The antenna 54 senses target temperature, which is proportional to the radiated target energy. The energy passes through the switch 58 and into the series of low noise amplifiers (LNA) 60, formed as MMIC chips in some examples. A bandpass filter sets the receiver bandwidth. The detector 64 is typically designed as a square law detector for detecting the signal, passing it to the integrator 66, which sums the signal over an observation period. The integrated signal is digitized, compensated for gain variation, and processed for video display within the data acquisition and processing circuit 68. To cancel the effects of gain variation over time and temperature, the switch 58 samples the reference source 56. Gain variations in the receiver are cancelled using the measured reference signal.

Figure 5:
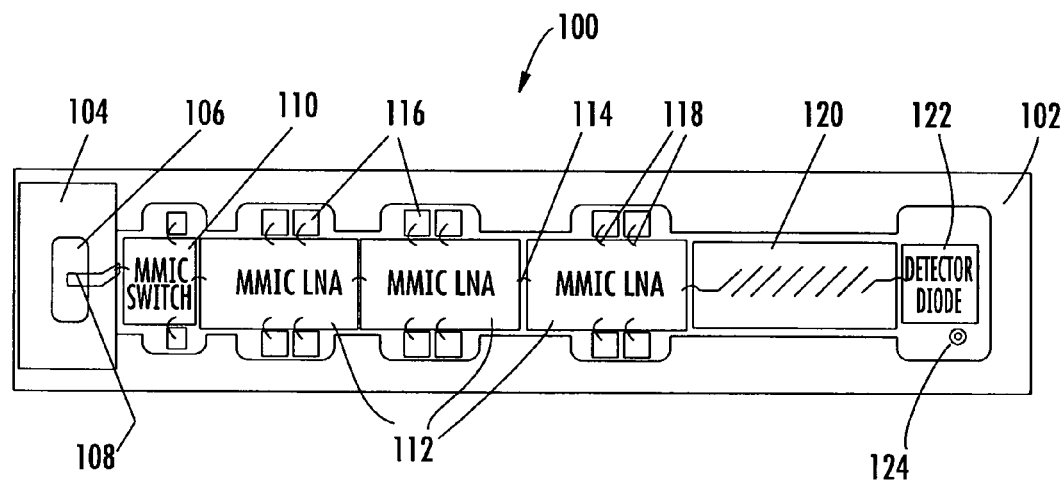
FIG. 5 is a plan view showing basic components of the radio frequency (RF) front-end of a radiometer.

FIG. 5 is a top plan view of a typical component layout for a radiometer high frequency front-end system 100, for example, as shown in FIG. 4. Various components as illustrated can be contained on a housing 102 formed from metal or similar conductive material. A microstrip-to-waveguide transition 104 can be formed as a backshort 106 that includes a launch probe 108 connected into the Dicke switch 110, formed for example, as a MMIC switch. The Dicke switch 110 connects to series-connected low noise amplifiers (LNA's) 112, typically formed as MMIC chips, and connected to each other by ribbon bonds 114. Capacitors 116 are connected by wire bonds 118 to the MMIC switch and LNA's 112. The last series connected LNA 118 is connected to a printed filter 120, which is connected to a detector diode 122 having a detected output feedthrough 124. Any feedhorn such as the type discussed above is usually connected to the RF front end at the microstrip-to-waveguide transition 104.

The MMIC chips and the capacitors 116 are typically mounted, using epoxy or eutectic solder, inside a narrow machined channel in the metal housing 102. The MMIC chips are typically connected to DC bypass capacitors 116 with the wire bonds 118. The RF connections between the MMIC chips are usually made with the ribbon bonds 114 to minimize losses. The filter 120 is typically formed as a coupled line printed filter on a hard or soft substrate. The detector diode 122 is typically mounted on a small piece of substrate that has the necessary matching network. A metal cover (not shown) is typically used to seal the overall unit. The DC signals are provided to the unit via DC connectors or feedthroughs (not shown).

As discussed above, current radiometer sensors typically have high cost and physical restrictions, preventing commercialization of the sensors. Radiometer sensors, in accordance with non-limiting examples of the present invention, however, can be manufactured in volume and overcome many of the physical restrictions of prior art sensors. In accordance with one non-limiting example of the present invention, the radiometer sensor cell incorporates a packaging technique that allows RF energy sensing and detection in a miniature package, similar to a light sensing diode, except it senses RF energy instead of light. The diode equivalent circuit for radiometer RF sensing is referred to herein as a radiometer sensor cell and could be termed radiometer pixel cell, a radiometer pixel, or "Radipixel," designating a self-contained radiometer sensor cell that encompasses the RF feed, signal amplification, switching (if required) and detection in one integrated package. Because the RF functions and detection are self-contained, these radiometer sensor cells can be packaged in small surface mount chips that mount directly to a substrate board, such as an FR4 board or similar support board, for example, a printed wiring board.

To minimize the size of the radiometer sensor cells, in accordance with a non-limiting example of the present invention, different manufacturing and assembly techniques can be used effectively. For example, large air filled feedhorns and waveguides can be replaced with dielectrically filled feedhorns and waveguides. Use of a dielectric material allows shrinking of the feedhorn and the waveguide size by $\sqrt{\varepsilon}$, where c is the dielectric constant of the fill material.

The number of MMIC chips can be reduced by using multifunction chips. For example, the LNA and the switch, or the LNA and the detector circuit, can be combined into a single chip.

The RF filter can be eliminated by designing the LNA's with the proper out-of-board rejection. Examples of some of these manufacturing techniques and MMIC chips that can be used or modified for the present invention are described in commonly assigned U.S. Patent Publication Nos. 2005/0063447 and 2005/0122254, the disclosures which are hereby incorporated by reference in their entirety.

Figure 6:
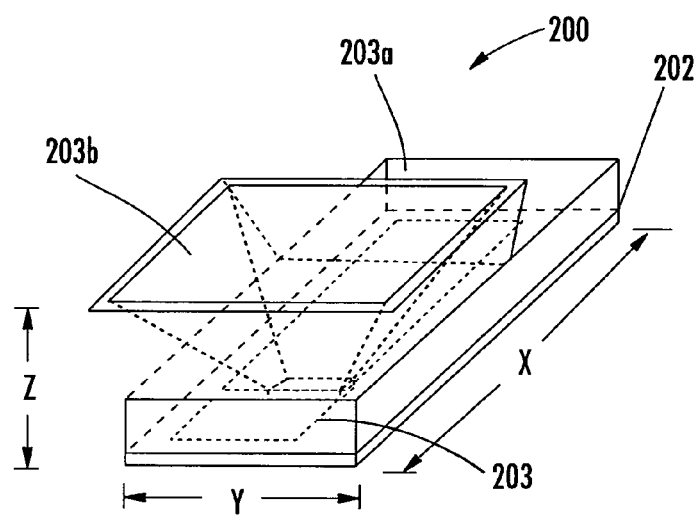
FIG. 6 is a perspective view of a radiometer sensor cell as an integrated package also referred to as a radiometer pixel cell, in accordance with one non-liming aspect of the present invention, which includes an RF feed, signal amplification, any required switching, and detection.

FIG. 6 is an isometric view of a radiometer sensor cell, in accordance with one non-limiting example of the present invention, and illustrated at 200. The length (X), width (Y), and height (Z) can be about 7×4.5×6.5 mm, in one non-limiting example, including a dielectrically filled feedhorn, as shown by the X, Y, Z dimensions along the side. The base 202 of the radiometer sensor cell 200 can be produced from soft board, metal, plastic or ceramic material. A radiometer circuit 203 is mounted on the base and includes an RF feed as a feedhorn and associated transition to be explained below, and a MMIC. A cover 203a can be formed from injection molded plastic with metal plating in selected areas and secured by epoxy or soldering to the base in one non-limiting example. The feedhorn 203b can be molded and shaped as illustrated as part of the cover 203a, and can be filled with a highly controlled, dielectric material, for example, a resin or polymer such as polytetrafluorethylene (PTFE), sold under the trade designation Teflon or similar polymer material. Of course, there are many other possible shapes and forms that a radiation sensor cell 200 can take.

FIGS. 7A–7D show respective inside, top, bottom and cross-sectional views of a radiometer sensor cell 200 that can be used in accordance with one non-limiting example of the present invention. The radiometer sensor cell 200 includes the base 202 forming a small board (FIG. 7D) as illustrated. The RF feed includes a microstrip-to-waveguide transition 204 formed on the base 202 and includes backshort vias 206 that provide isolation. The transition 204 includes a backshort 208 and a launch probe 210 connected to series connected MMIC chips 212 that are connected using a ribbon bond 214. Capacitors 216 interconnect to the MMIC chips using appropriate wire bonds 218. Signal vias 220 are placed at the longitudinal sides of the series connected MMIC chips. Although only two MMIC chips are shown in FIG. 7A, it should be understood that different number of series connected MMIC chips can be used, and in some instances, can be parallel.

The top view of the radiometer sensor 200 is shown at FIG. 7B, and includes a cover 230 and dielectric feedhorn 232. The cover has a small channel forming a MMIC channel 233 as shown in the cross-sectional view of FIG. 7D. The bottom view of the radiometer sensor cell 200 (FIG. 7C) includes surface mount technology (SMT) contacts 234, the signal vias 220 that extend upward as shown in FIGS. 7A and 7C, and heat sink vias 236. The cross-sectional view of the radiometer sensor cell 200 is shown in FIG. 7D and includes the cover 230 with the dielectric filled feedhorn 232. The cover defines a configuration for the feedhorn, as illustrated, which is filled with the dielectric material. The base 202 is formed with a base layer 240 and dielectric layer 242. The MMIC chips 212 are mounted on the dielectric layer as illustrated, with appropriate vias 236 formed for the heatsink vias as illustrated. The backshort vias 206 are illustrated as operative with the microstrip-to-waveguide transition 208.

As shown in the FIGS. 7A–7D, the radiometer sensor cell has a base 202, which forms a carrier for the MMIC chips 212 and provides support for the dielectrically filled backshort 208. The bottom of the base 202 provides a leadless surface mount technology (SMT) connection with the contacts 234 that connect to other boards. The vias 220 carry DC and ground signals from the bottom of the radiometer sensor cell 200 to the inside of the MMIC chips 212 and carry the detected signals from the MMIC chip to the bottom of the radiometer sensor cell formed as a chip. The heat sink vias 236 carry the heat from the MMIC's down through the base to a mounting board on which the radiometer sensor cell as a separate cell or chip is mounted.

The cover 230 can be made from injection molded plastic with selective metal plating in key areas such as at the MMIC channel 233 and at the feedhorn 232, and as illustrated, encloses the MMIC and RF feed, i.e., the transition and feedhorn, except of course the very top of the feedhorn. The cover 230 can be fabricated by using well-known micro-molding techniques. The feedhorn 232 can be filled with dielectric material as described before. This type of material could be available in liquid form and can easily fill the feedhorn.

The RF energy from a target is captured by the dielectrically filled feedhorn 232. The energy is transformed from the waveguide media to a microstrip using the backshort 208, which is built into the base. Any signals are amplified using one or more of the low noise amplifiers formed in these examples as part of the MMIC chips 212. The amplified signal is detected using a square law detector diode as will be explained below. Once detected, the signal can be transferred from the radiometer sensor cell 200 to other functions on a support board such as a printed wiring board, typically having a plurality of the radiometer sensor cells mounted thereon.

Figure 8A:
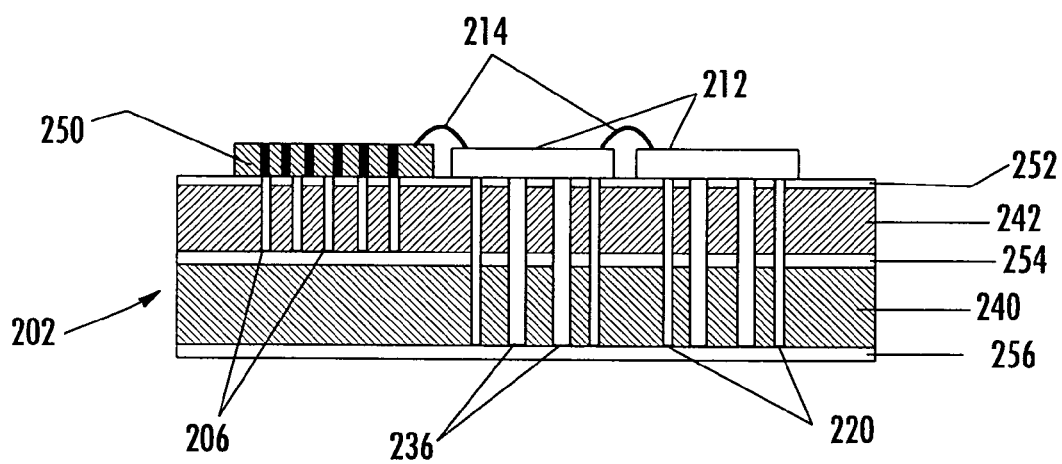
FIG. 8A is a cross-sectional view of the base used with the radiometer sensor cell shown in FIG. 7D.
Figure 8B:
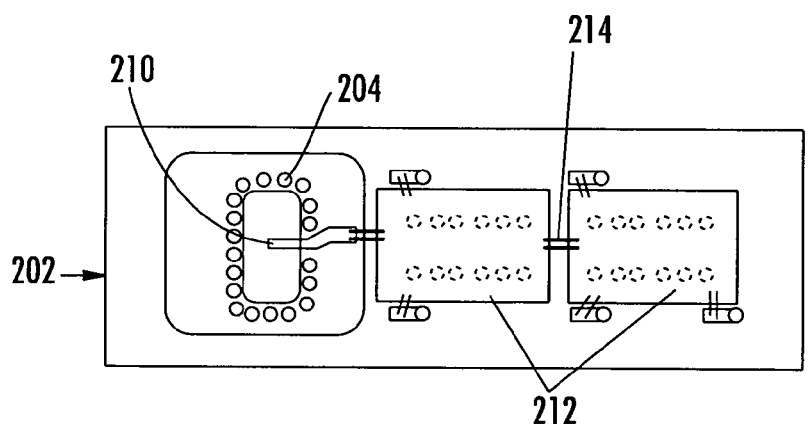
FIG. 8B is a top plan view of the radiometer base similar to that shown in FIG. 7A.

FIGS. 8A and 8B show further details of a base 202 used with the radiometer sensor cell and the layout of MMIC chips 212 thereon. As illustrated, the base 202 is formed from an FR4 or similar board forming a bottom layer 240 and a top dielectric layer 242. Another dielectric layer 250 is formed over a copper layer 252 positioned on top of the dielectric layer 242. This copper layer 252 can be formed as a thin layer of about one-half ounce. Another copper layer 254 extends between the dielectric layer 242 and FR4 layer 240 and can be about one-half ounce. Another copper layer 256 forms a ground plane or other base layer as shown on the bottom portion of the overall base 202 forming together a support or board. The different backshort vias 206, ribbon bonds 214, MMIC chips 212, and heat sink vias 236 are illustrated.

Additional DC vias as signal vas 220 extend from the MMIC chips to the bottom copper layer 256 as illustrated. In this example, the base board material 240 could be an FR4 layer and the top dielectric layer 242 could be a laminated dielectric material such as Rogers 5880. As known to those skilled in the art, FR4 is a type of board used for making a printed circuit board and is an abbreviation for flame resistant 4 and formed as a composite of a resin epoxy reinforced with a woven fiberglass mat. This description typically describes the board with no copper covering and is less reactive at high frequencies and absorbs less moisture than typical synthetic resin bonded paper, FR4 board greater strength and stiffness than others. It is acceptable for signals up to and exceeding 10 GHz. Rogers 5880 board is a high frequency laminate that is formed as a glass microfiber reinforced PTFE composite that can be designed for exacting stripline and microstrip circuit applications. The glass reinforcing microfibers can be randomly oriented to maximize benefits of fiber reinforcement in the directions valuable to circuit producers. The laminates are easily cut, sheered and machined to a desired shape and are resistant to many solvents and reagents, hot or cold, normally used in etching printed circuits or in plating edges and holes. Typically a Rogers board is formed as a laminate and has some electrode deposited copper of about one-quarter to about two ounces per square foot, which is about eight to about 70 micrometers on both sides.

The bases 202 used for each radiometer sensor cell 200 can be fabricated from a large board and cut to size after fabrication. An 8.5 by 11 inch board can yield over 1500 radiometer sensor cell bases 202. The total package cost (base and cover) is typically less than about $1 in volume at present day prices. The MMIC chips 212 can be connected to the base 202 using conductive epoxy or eutectic solder. Other techniques, for example, flip chip technology may be used to connect the MMIC chips 212 to the base.

Recent advances in high frequency MMIC design and improved detector diode sensitivity has also made it possible to integrate multiple functions into a single MMIC chip. FIGS. 9A, 9B and 9C show three single-chip MMIC designs for combining RF amplification and detection functions into a single MMIC chip. These designs use a 90 degree hybrid circuit similar to that hybrid circuit disclosed in copending and commonly assigned U.S. Published Patent Application Nos. 2005/0063447 and 2005/0122254, the disclosures which are hereby incorporated by reference in their entirety. As shown in the figures, a single MMIC chip may include any LNA gain stages, a switch, any necessary hybrids and the detector diode.

In the following description, functional elements common to the three embodiments are given the same reference numeral. Each MMIC chip in FIGS. 9A, 9B and 9C is given the description 300, 300a and 300b successively. FIGS. 9A, 9B and 9C show each MMIC chip could include a first or input quadrature hybrid circuit 302 having two signal paths at its output and series connected low noise amplifiers 304, followed by a second output quadrature hybrid circuit 306, and a non-reflective switch 308, and detector circuit 310 that includes a diode 311. Minor differences include the addition of variable gain amplifiers 312 as shown in FIG. 9A with the expected gain control 313 as illustrated. Only one diode 311 is used in the detector circuit 310 in FIG. 9A, while two diodes 311 are used in the detector circuit 310 of FIG. 9B. No variable gain amplifier is illustrated in the MMIC 300a of FIG. 9B, but variable gain is possible as illustrated. The single chip 300b in FIG. 9C includes a variable gain amplifier 314 after the switch 308 and appropriate gain control. Another amplifier 316 is connected to the variable gain amplifier 314. A single diode is used in the detector circuit 310 as illustrated. The inputs can be one RF input 340 and a load 342, which can be on or off the MMIC. One or two detected outputs 344, 346 can be used as illustrated. Appropriate switch control 350 can be incorporated into MMIC. Vg and Vd pads 352, 354 can be included.

The radiometer sensor cell in one non-limiting embodiment does not include a bandpass filter. The function of a filter can be integrated into the low noise amplifier characteristics. For example, if the radiometer sensing bandwidth is between about 80 and 100 GHz, the LNA gain characteristics can be tailored to match this bandwidth.

Figure 10:
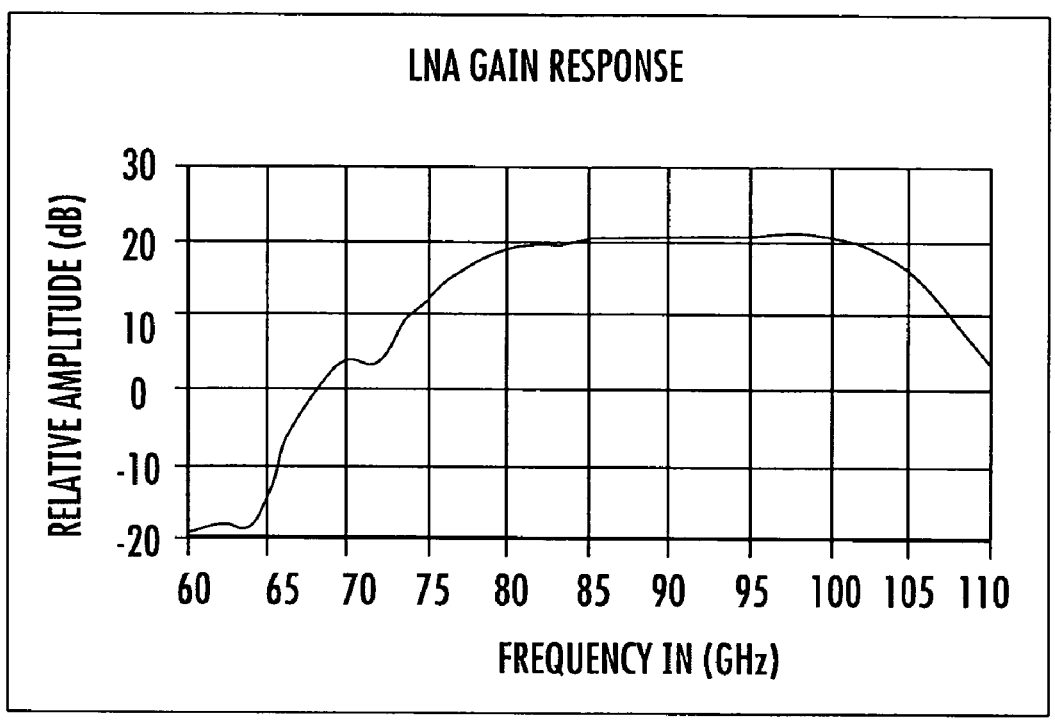
FIG. 10 is a graph showing the low noise amplifier (LNA) gain response and showing relative amplitude vs. frequency input for a radiometer sensor cell, in accordance with one non-limiting example of the present invention.

FIG. 10 is a graph showing an example of an LNA gain response over frequency. As shown in this graph, no bandpass filter is required because the LNA gain response provides the necessary rejections.

Figure 11A:
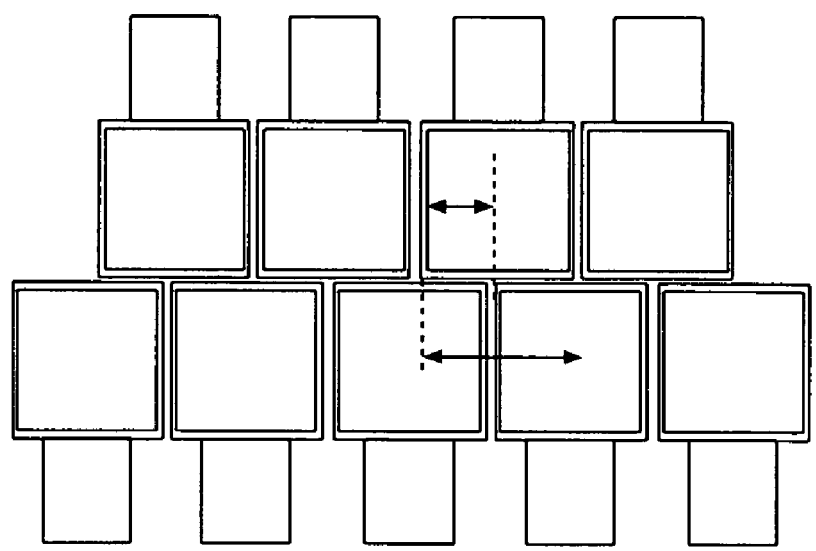
FIG. 11A is a top plan view showing a radiometer sensor assembly formed from a plurality of radiation sensor cells mounted on a printed wiring board, for example, in accordance with one non-limiting example of the present invention.
Figure 11B:
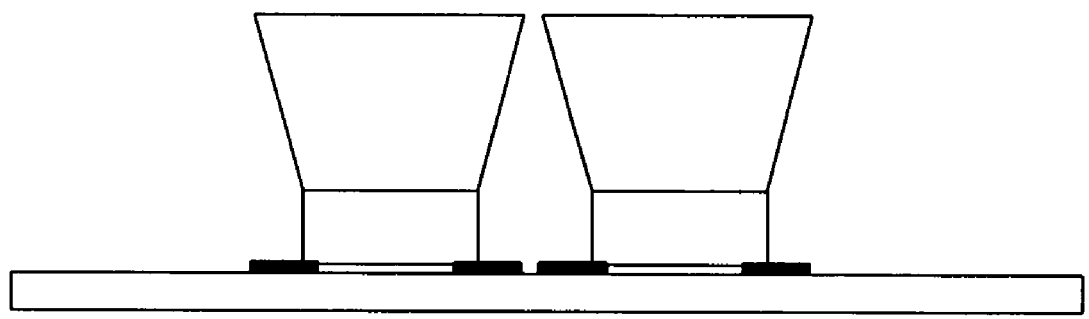
FIG. 11B is an enlarged front elevation view showing a plurality of the radiation sensor cells mounted on a printed wiring board, in accordance with one non-limiting example of the present invention.

With a total width of a radiometer sensor cell at less than about 4.5 mm in one non-limiting example, spacing between individual sensors can be as little as 4.6 mm, which is about 1.4λ (wavelength) at 90 GHz. With a half-width offset between two rows, as shown in the plan view of FIGS. 11A and 11B, cell-to-cell spacing can be reduced to about 0.7×, which is well within the desired one λ spacing The radiometer sensor cells 200 can be mounted directly on an FR4 board or other similar board using solder or other similar system. The "V" shape of the radiometer cell allows sufficient room for footprints on the board. Of course, using higher dielectric constant material in the feedhorn and the waveguide transition will further reduce the size of the feedhorns and cell-to-cell spacing.

Figure 12:
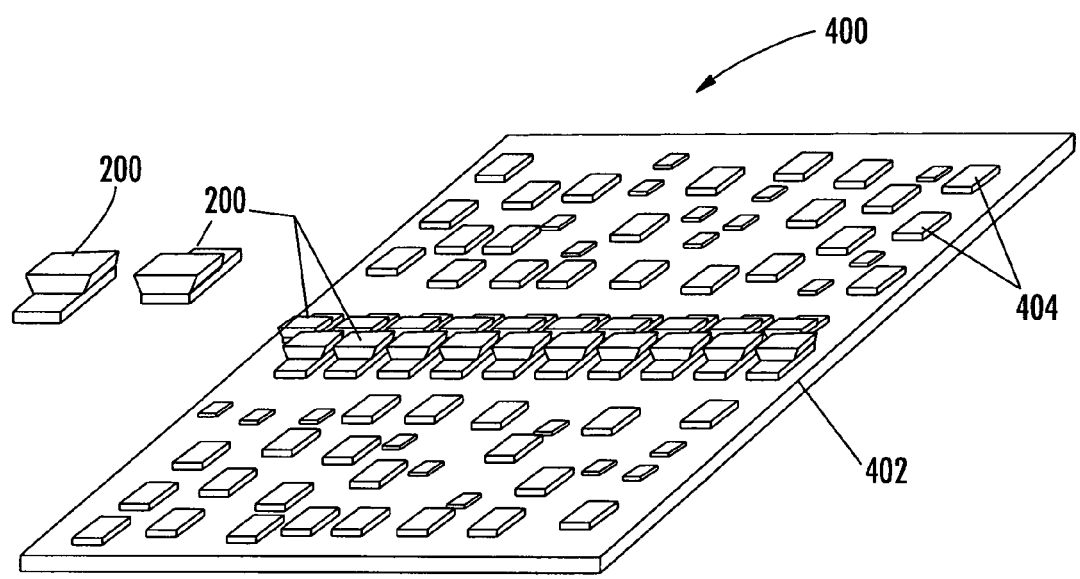
FIG. 12 is a perspective view of a multi-channel radiometer printed wiring board and having a plurality of radiation sensor cells mounted thereon and other surface mounted technology (SMT) components.

FIG. 12 shows a possible layout of a 20-sensor (or "cell") radiometer device illustrated generally at 400. The radiometer sensor cells 200 are mounted directly to the FR4 support board 402 along with the rest of the surface mount technology (SMT) components 404. The radiometer sensor RF sensing and detection is entirely enclosed in itself, and therefore no RF isolation or channelization hardware is required. The radiometer sensor cells 200 can be surface mounted and allow complete flexibility in how the sensors are mounted on the board. Polarization selection can be made by rotating the cells. An entire multi-channel radiometer can be constructed on a single FR4 board and no additional circuits or housing is required.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An integrated radiometer sensor cell comprising:
   a base having opposing surfaces, one surface adapted for surface mounting on a board;

a radio frequency (RF) feed that receives RF signals and mounted on the base opposite the side that is surface mounted;

at least one MMIC mounted on the base and operatively connected to said RF feed that receives the RF signals from said RF feed, said MMIC comprising at least one quadrature hybrid used to equalize the gain in two parallel amplifier stages, including a low noise amplifier (LNA) connected thereto, and a detector circuit for producing a detected signal for further radiometer processing; and a cover secured on the base and enclosing the RF feed and at least one MMIC.

2. A radiometer sensor cell according to claim 1, wherein said RF feed comprises a dielectric filled feedhorn.

3. A radiometer sensor cell according to claim 2 wherein said feed horn has a shape configured by said cover.

4. A radiometer sensor cell according to claim 2, wherein said RF feed comprises a microstrip-to-waveguide transition operatively connected between said feedhorn and said MMIC that receives RF signals from said feedhorn and passes the RF signals into the MMIC.

5. A radiometer sensor cell according to claim 4, wherein said microstrip-to-waveguide transition further comprises backshort vias and a launch probe operatively connected to said MMIC for passing RF signals to the MMIC.

6. A radiometer sensor cell according to claim 1, wherein said MMIC further comprises a switch connected to a quadrature hybrid.

7. A radiometer sensor cell according to claim 1, wherein said MMIC comprises:

an input quadrature hybrid having at least one RF input and parallel signal path outputs operatively connected to a respective amplifier within each signal path and an output quadrature hybrid connected to each respective amplifier for outputting a signal to be detected by said detector circuit.

8. A radiometer sensor cell according to claim 7, wherein said MMIC further comprises a switch connected to said output quadrature hybrid and said detector circuit comprises a diode operatively connected to said switch for forming a detected output.

9. A radiometer sensor cell according to claim 1, wherein said MMIC further comprises a variable gain amplifier.

10. A radiometer sensor cell according to claim 1, and further comprising DC signal vias extending from said at least one MMIC through said base.

11. A radiometer senor cell according to claim 1, wherein said cover has a channel formed thereon providing a MMIC channel between the base and cover.

12. A radiometer sensor cell according to claim 1, wherein said cover is formed from a material selected from the group consisting of soft-board, metal, plastic or ceramic.

13. A radiometer sensor cell according to claim 1, and further comprising an adhesive or solder engaging the cover for securing the cover to the base.

14. A radiometer sensor assembly comprising:

a support board; and a plurality of an integrated radiometer sensor cells surface mounted on the support board in a predetermined configuration and interconnected together, each integrated radiometer sensor cell comprising, a base surface mounted on the support board;

a radio frequency (RF) feed that receives RF signals and mounted on the base opposite the support board;

at least one MMIC mounted on the base opposite the support board and operatively connected to said RF feed that receives the RF signals from said RF feed, said MMIC comprising at least one quadrature hybrid used to equalize the gain in two parallel amplifier stages, including a low noise amplifier (LNA) connected thereto, and a detector circuit for producing a signal for further radiometer processing, and a cover secured on the base and enclosing the RF feed and at least one MMIC.

15. A radiometer sensor assembly according to claim 14, wherein said radiometer sensor cells are oriented on the support board for a desired polarization.

16. A radiometer sensor assembly according to claim 14, wherein said support board comprises a printed wiring board.

17. A radiometer sensor assembly according to claim 14, wherein said RF feed comprises a dielectric filled feedhorn.

18. A radiometer sensor assembly according to claim 17, wherein said feed horn has a shape configured by said cover.

19. A radiometer sensor assembly according to claim 14, wherein said RF feed comprises a microstrip-to-waveguide transition operatively connected between said feedhorn and said MMIC that receives RF signals from said feedhorn and passes the RF signals into the MMIC.

20. A radiometer sensor assembly according to claim 14, wherein said MMIC comprises a switch connected to a quadrature hybrid.

21. A radiometer sensor assembly according to claim 14, wherein said MMIC comprises an input quadrature hybrid having at least one RF input and parallel signal path outputs operatively connected to a respective amplifier within each signal path and an output quadrature hybrid connected to each respective amplifier for outputting a signal to be detected by said detector circuit.

22. A radiometer sensor assembly according to claim 21, wherein said MMIC further comprises a switch connected to said output quadrature hybrid, and said detector circuit comprises a diode operatively connected to said switch for forming a detected output.

23. A radiometer sensor assembly according to claim 14, and further comprising DC signal vias extending from said at least one MMIC through said base.

24. A radiometer sensor assembly according claim 14, wherein said cover has a channel formed thereon providing a MMIC channel between the base and cover.

25. A radiometer sensor assembly according to claim 14, wherein said cover is formed from a material selected from the group consisting of soft-board, metal, plastic or ceramic.

* * * * *